US012636529B2

(12) United States Patent
DeNunzio et al.

(10) Patent No.: US 12,636,529 B2
(45) Date of Patent: May 26, 2026

(54) CONTROLLED SYSTEM AND METHODS OF STORAGE STRUCTURE FIRE PROTECTION

(71) Applicant: Tyco Fire Products LP, Lansdale, PA (US)

(72) Inventors: Cassandra Lyn DeNunzio, Cranston, RI (US); Pedriant Pena, Bellingham, MA (US); Manuel R. Silva, Jr., Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 645 days.

(21) Appl. No.: 18/007,431

(22) PCT Filed: Oct. 26, 2021

(86) PCT No.: PCT/IB2021/059901
§ 371 (c)(1),
(2) Date: Jan. 30, 2023

(87) PCT Pub. No.: WO2022/090941
PCT Pub. Date: May 5, 2022

(65) Prior Publication Data

US 2023/0271040 A1 Aug. 31, 2023

Related U.S. Application Data

(60) Provisional application No. 63/106,987, filed on Oct. 29, 2020.

(51) Int. Cl.
*A62C 3/00* (2006.01)
*A62C 37/40* (2006.01)
*A62C 37/48* (2006.01)

(52) U.S. Cl.
CPC .............. *A62C 3/002* (2013.01); *A62C 37/40* (2013.01); *A62C 37/48* (2013.01)

(58) Field of Classification Search
CPC ......... A62C 37/40; A62C 37/48; A62C 3/002; A62C 37/46; A62C 37/10; A62C 37/36;
(Continued)

(56) References Cited

U.S. PATENT DOCUMENTS

2016/0101305 A1 4/2016 Dedina et al.
2017/0113078 A1* 4/2017 Magnone ................. A62C 3/00

FOREIGN PATENT DOCUMENTS

KR 10-2093015 B1 3/2020
WO WO-2007/051240 A1 5/2007
(Continued)

OTHER PUBLICATIONS

Korean Intellectual Property Office (KIPO) as International Searching Authority; International Search Report and Written Opinion; International Patent Application No. PCT/IB2021/059901; Feb. 4, 2022; 10 pages.

*Primary Examiner* — Christopher R Dandridge
(74) *Attorney, Agent, or Firm* — Foley & Lardner LLP

(57) ABSTRACT

Systems and methods of ceiling-only fire protection of a storage structure are provided. The system can include a plurality of fluid distribution devices disposed in a grid pattern beneath a ceiling and above the storage structure. The plurality of fluid distribution devices can include a frame body, seal assembly and actuator. The system can include a fluid distribution system including network of pipes interconnecting the plurality of fluid distribution devices with a water supply. The system can include a plurality of detectors to monitor the storage structure for a fire. The system can include a controller coupled to the plurality of detectors to detect and locate the fire, and coupled to the plurality of fluid distribution devices to identify and control operation of a select number of the
(Continued)

plurality of fluid distribution devices that define a discharge array above and about the fire.

20 Claims, 9 Drawing Sheets

(58) Field of Classification Search
CPC ......... A62C 37/04; A62C 37/44; A62C 35/60; A62C 35/68; Y10T 137/7761
See application file for complete search history.

(56) References Cited

FOREIGN PATENT DOCUMENTS

| | | | |
|---|---|---|---|
| WO | WO-2019/226531 | A1 | 11/2019 |
| WO | WO-2020/021093 | A1 | 1/2020 |

* cited by examiner

CONTROLLED SYSTEM AND METHODS OF STORAGE STRUCTURE FIRE PROTECTION

CROSS-REFERENCE TO RELATED APPLICATIONS

The present application claims the benefit of priority to U.S. Provisional Application No. 63/106,987, filed Oct. 29, 2020, the disclosure of which is incorporated herein by reference in its entirety.

BACKGROUND

Fire protection systems are used to deliver fluid to a location at which a fire may be taking place. Fire protection systems can be actuated in response to trigger conditions, such as smoke or heat. Electronic fire protection systems can be actuated using an electric impulse.

SUMMARY

At least one aspect relates to a system of ceiling-only fire protection of a storage structure. The system can include a plurality of fluid distribution devices, a fluid distribution system, a plurality of detectors to monitor the storage structure for a fire, and a controller. The plurality of fluid distribution devices can be disposed in a grid pattern beneath a ceiling and above the storage structure. The storage structure can have a nominal storage height less than a nominal ceiling height. Each of the fluid distribution devices can include a frame body with a seal assembly disposed therein. Each of the fluid distribution devices can include an actuator arranged with the frame body to displace the seal assembly to control a flow of water discharge from the frame body. The fluid distribution system can include a network of pipe interconnecting the plurality of fluid distribution devices with a water supply. The controller can couple with the plurality of detectors to detect and locate the fire. The controller can couple to the plurality of fluid distribution devices to identify and control operation of a select number of the plurality of fluid distribution devices that define a discharge array above and about the fire. The controller can receive an input signal from each of the plurality of detectors. The controller can determine adjacency of each of the plurality of detectors based on their respective locations in the grid pattern At least one aspect relates to a method of ceiling-only fire protection of a storage structure. The method can include providing a plurality of fluid distribution devices disposed in a grid pattern beneath a ceiling and above the storage structure. The storage structure can have a nominal storage height less than a nominal ceiling height. Each of the fluid distribution devices can include a frame body with a seal assembly disposed therein. Each of the fluid distribution devices can include an actuator arranged with the frame body to displace the seal assembly to control a flow of water discharge from the frame body. The method can include connecting a fluid distribution system including a network of pipes to the plurality of fluid distribution devices with a water supply. The method can include providing a plurality of detectors to monitor the storage structure for a fire. The method can include coupling a controller with the plurality of detectors to detect and locate the fire. The method can include coupling the controller with the plurality of fluid distribution devices to identify and control operation of a select number of the plurality of fluid distribution devices that define a discharge array above and about the fire. The method can include receiving, by the controller, an input signal from each of the plurality of detectors. The method can include determining, by the controller, adjacency of each of the plurality of detectors based on their respective locations in the grid pattern.

At least one aspect relates to a method for providing a ceiling-only fire protection system of a storage structure. The method can include providing a plurality of fluid distribution devices disposed in a grid pattern beneath a ceiling and above the storage structure. The storage structure can have a nominal storage height less than a nominal ceiling height. Each of the fluid distribution devices can include a frame body with a seal assembly disposed therein. Each of the fluid distribution devices can include an actuator arranged with the frame body to displace the seal assembly to control a flow of water discharge from the frame body. The method can include providing a fluid distribution system including a network of pipes interconnecting the plurality of fluid distribution devices with a water supply. The method can include providing a plurality of detectors to monitor the storage structure for a fire. The method can include providing a controller coupled with the plurality of detectors to detect and locate the fire. The controller can couple to the plurality of fluid distribution devices to identify and control operation of a select number of the plurality of fluid distribution devices that define a discharge array above and about the fire. The controller can receive an input signal from each of the plurality of detectors. The controller can determine adjacency of each of the plurality of detectors based on their respective locations in the grid pattern.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
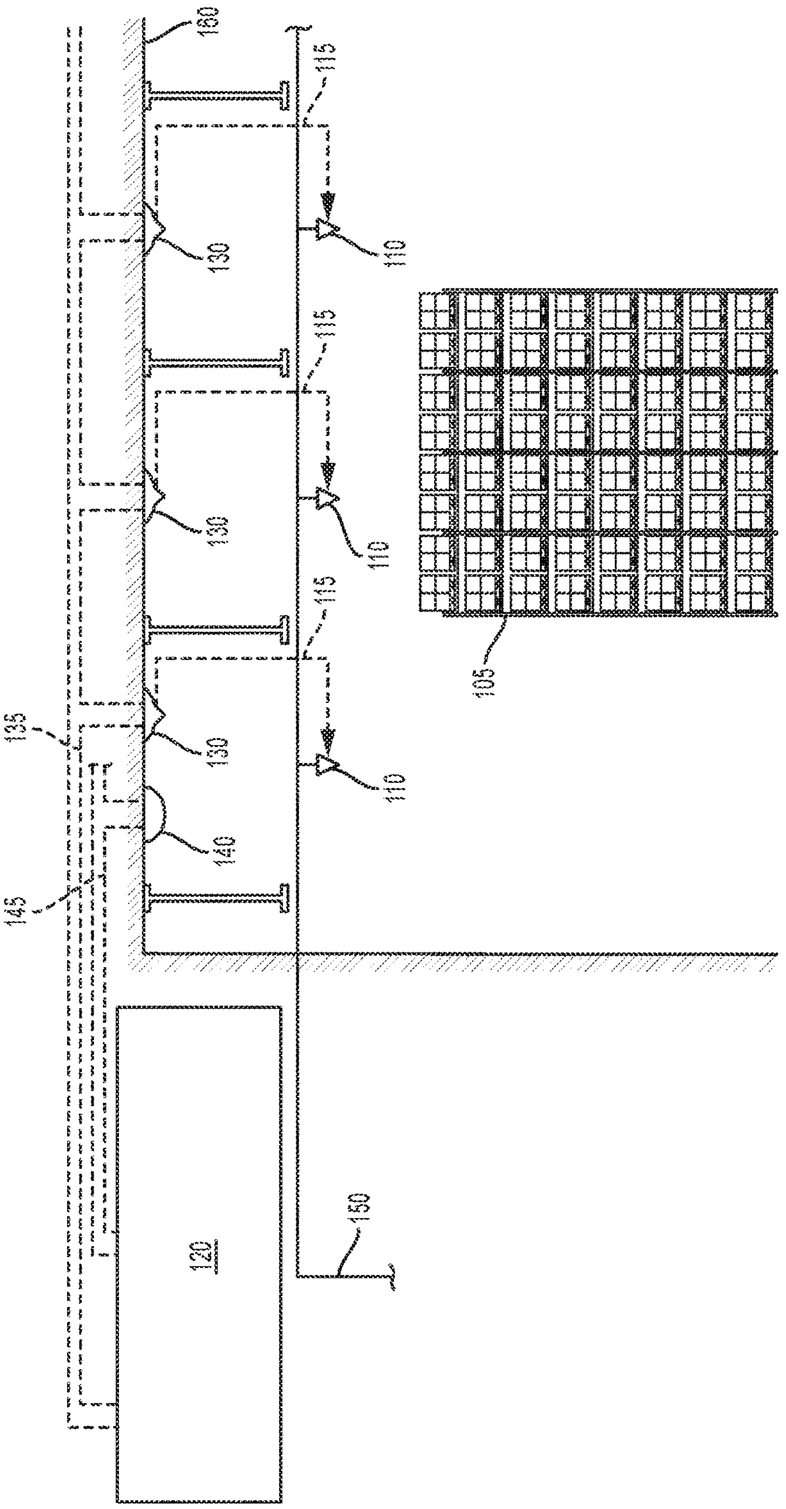
FIG. 1 is an illustration of a ceiling-only fire protection of a storage structure.

Referring to FIG. 1, among others, shows a fire protection system 100 for the protection of the storage structure 105 and an occupancy of the storage structure 105. The systems and methods described herein utilize two principles for fire protection of the storage occupancy: (i) detection and location of a fire; and (ii) responding to the fire at a threshold moment with a controlled discharge and distribution of a preferably fixed minimized volumetric flow of firefighting fluid, such as water, over the fire to effectively address and more preferably extinguish the fire. Moreover, the systems and methods include fluid distribution devices coupled to a means to address and more preferably extinguish a fire. Moreover, the systems and methods include fluid distribution devices to simultaneously operate one or more sprinklers.

The fire protection system 100 of a storage structure 105 can include a plurality of fluid distribution devices 110, a fluid distribution system 150, a plurality of detectors, and a controller 120. The storage structure 105 can include densely packed storage structures (e.g., double-deep rack, push-back rack, pallet flow rack). The storage structure 105 can include rack arrangements (e.g., single-row racks, multi-row racks) and non-rack storage systems including for example: palletized, solid-piled (stacked commodities), bin box (storage in five-sided boxes with little to no space between boxes), shelf (storage on structures up to and including thirty inches deep and separated by aisles of at least thirty inches wide) or back-to-back shelf storage (two shelves separated by a vertical barrier with no longitudinal flue space and maximum storage height of fifteen feet).

The stored commodity in the storage structure 105 can include any one of NFPA-13 defined Class I, II, III or IV commodities, alternatively Group A, Group B, or Group C plastics, elastomers, and rubbers, or further in the alternative any type of commodity capable of having its combustion behavior characterized. With regard to the protection of Group A plastics, the systems and methods can be configured for the protection of expanded and exposed plastics. According to NFPA 13, Sec. 3.9.1.13, "Expanded (Foamed or Cellular) Plastics" is defined as "[t]hose plastics, the density of which is reduced by the presence of numerous small cavities (cells), interconnecting or not, disposed throughout the mass." Section 3.9.1.14 of NFPA 13 defines "Exposed Group A Plastic Commodities" as "[t]hose plastics not in packaging or coverings that absorb water or otherwise appreciably retard the burning hazard."

Figure 2:
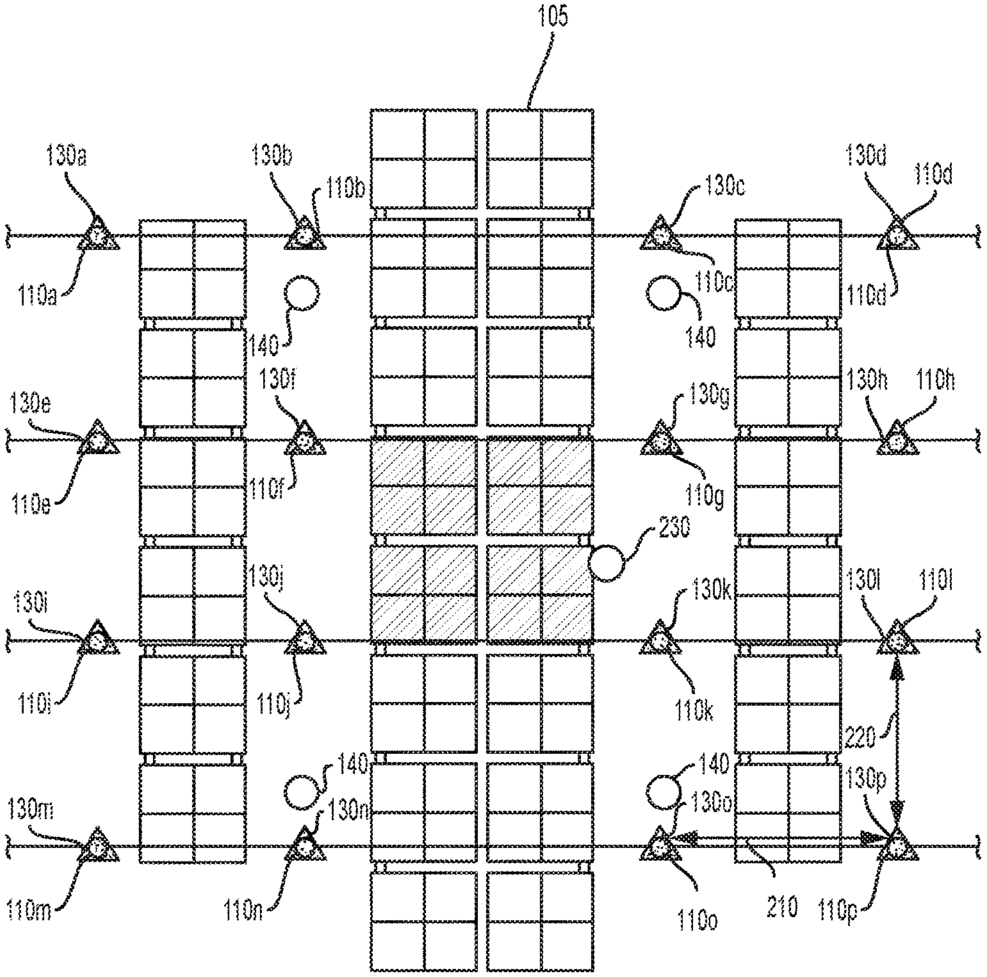
FIG. 2 is an illustration of an installation pattern for a ceiling-only fire protection of a storage structure.
Figure 3:
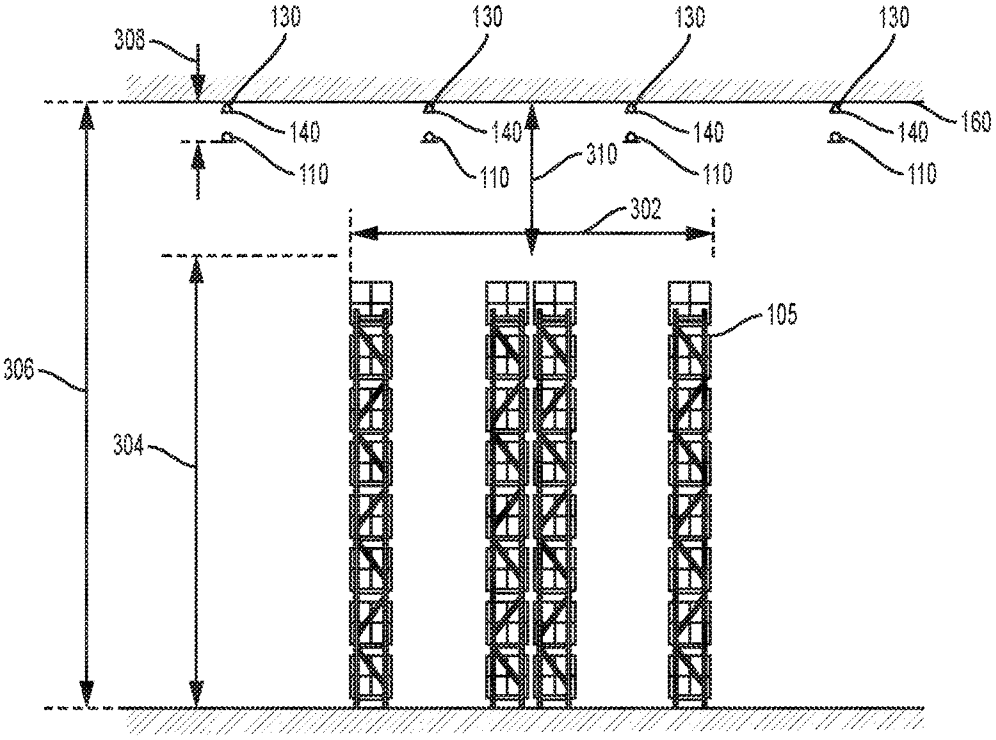
FIG. 3 is an illustration of an installation for a ceiling-only fire protection of a storage structure.

In the ceiling-only arrangement of the system 100, the fluid distribution devices 110 are installed between the ceiling 160 and a plane defined by the storage structure 105 as shown in FIGS. 1, 2, and 3. The fluid distribution devices 110 can be mounted or connected to the fluid distribution system 150. The fluid distribution system 150 includes a network of pipes having a portion suspended beneath the ceiling of the occupancy and above the storage structure 105 to be protected. The fluid distribution devices 110 can be electronic fluid distribution devices, as described below. The fluid distribution devices 110 can be electronically coupled to a temperature sensor 130 or the controller 120. The electronic coupling can be a wired or wireless connection. For example, the fluid distribution device 110 can be wired to a temperature sensor 130 to receive an actuation signal. In another example, the fluid distribution device 110 can be wirelessly connected (e.g., network connection, Bluetooth) to the controller 120 to receive an actuation signal.

The fluid distribution system 150 can include a network of pipes to provide for ceiling-only protection. The network of pipes can include one or more main pipes, connected to a water supply, from which one or more branch lines extend. The network of pipes connect the fluid distribution devices 110 to a supply of firefighting liquid such as, for example, a water main or water tank. The network of pipes can further include pipe fittings such as connectors, elbows, and risers, etc. to interconnect the distribution system 150 to the fluid distribution devices 110. The fluid distribution system 150 can further include additional devices (not shown) such as, for example, alarm valves, control valves, fire pumps, or backflow preventers to deliver the water to the distribution devices 110 at a desired flow rate or pressure. The fluid distribution system 150 further can include a riser pipe which can extend from the fluid supply to the pipe mains. The riser can include additional components or assemblies to direct, detect, measure, or control fluid flow through the fluid distribution system 150. For example, the system can include a check valve to prevent fluid flow from the sprinklers back toward the fluid source. The system can also include a flow meter for measuring the flow through the riser and the system 100. Moreover, the fluid distribution system 150 and the riser can include a fluid control valve, such as for example, a differential fluid-type fluid control valve. The fluid distribution system 150 of system 100 can be configured as a wet pipe system (fluid discharges immediately upon device operation) or a variation thereof including, i.e., non-interlocked, single or double interlock preaction systems (the system piping is initially filled with gas and then filled with the firefighting fluid in response to signaling from the detectors such that fluid discharges from the distribution devices at its working pressure upon device operation).

The plurality of detectors in system 100 monitor the occupancy to detect changes for any one of temperature, thermal energy, spectral energy, smoke or any other parameter to indicate the presence of a fire in the occupancy. The detectors can be arranged in a cross-zone detection orientation. For example, the plurality of detectors in the system 100 can be separated into zones. A first zone can include temperature sensors 130 and smoke detectors 140, wherein the smoke detectors 140 are ionization smoke detectors. A second zone can include temperature sensors 130 and smoke detectors 140, wherein the smoke detectors 140 are photoelectric smoke detectors. A detection of smoke can be required from both zones to indicate a fire to ensure a fire has been sensed. One or more detectors for monitoring of the storage occupancy are preferably disposed proximate the fluid distribution device 110 and more preferably disposed below and proximate to the ceiling 160. The detectors can be mounted axially aligned with the fluid distribution device 110, as schematically shown in FIG. 3 or may alternatively be above and off-set from the distribution device 110, as schematically shown in FIG. 1. The detectors can additionally be aligned differently based on the type of detectors. For example, temperature sensor 130 can be axially aligned with the fluid distribution device 110 and the smoke detector 140 can be off-set, as shown in FIG. 2. Moreover, the detectors can be located at the same or any differential elevation from the fluid distribution device 110 provided the detectors are located above the commodity to support the ceiling-only protection. The detectors are coupled to the controller 120 to communicate detection data or signals to the controller 120 of the system 100 for processing as described herein. The ability of the detectors to monitor environmental changes indicative of a fire can depend upon the type of detector being used, the sensitivity of the detector, coverage area of the detector, or the distance between the detector and the fire origin. Accordingly, the detectors individually and collectively are appropriately mounted, spaced or oriented to monitor the occupancy for the conditions of a fire in a manner described.

The plurality of detectors can include a plurality of temperature sensors 130 to detect heat and a plurality of smoke detectors 140. The temperature sensors 130 can include thermocouples, thermistors, infrared detectors, and equivalents thereof. The plurality of smoke detectors 140 can include ionization smoke detectors, photoelectric smoke detectors, optical beam smoke detector, and equivalents thereof. The system 100 can have an equivalent number of smoke detectors 140 and temperature sensors 130, as shown in FIG. 3. The system 100 can have more smoke detectors 140 than temperature sensors 130. Alternatively, the system 100 can have more temperature sensors than smoke detectors 140, as shown in FIGS. 1 and 2.

The temperature sensors 130 can provide a detection signal based on determining a threshold moment in fire growth. The threshold moment in fire growth can be a particular temperature (e.g., 155° F.), a rate of rise in temperature (e.g., 20° F./min), etc. The detection signal can be transmitted to the controller 120 by a connection 135. The detection signal can be an analog signal, digital signal, fiber optic signal, etc. The connection 135 can be any one or more of wired or wireless communication.

The temperature sensor 130 can receive a control signal from the controller 120 and relay the control signal to a fluid distribution device 110. The signal can be received by the connection 135. The control signal can then be transmitted to the fluid distribution device 110 by the connection 115 between the temperature sensor 130 and the fluid distribution device 110. The control signal can also bypass the temperature sensor 130 and be transmitted directly from the controller 120 and the fluid distribution device 110.

The smoke detector 140 can provide a detection signal based on determining the presence of smoke. The signal can be transmitted to the controller by a connection 135. The detection signal can be an analog signal, digital signal, fiber optic signal, etc. The connection 145 can be any one or more of wired or wireless communication.

Shown in FIG. 2, among others, is a plan view of the ceiling-only system 100 disposed above a storage structure 105. Shown in particular is a grid of fluid distribution devices 110*a*-110*p* connected in horizontal rows by branches of the fluid distribution system 150, temperature sensors 130*a*-130*p*, and an arrangement of smoke detectors 140.

The grid pattern of the fluid distribution devices 110 and the temperature sensors 130 allows the controller 120 to simply identify adjacency. For example, temperature sensor 130*f* may be a focal point, as described below. In this instance 130*b* can be considered a temperature sensor located to the north of 130*f*, 130*c* can be considered a temperature sensor located to the north-east of 130*f*. In another example, 130*g* can be a focal point. In this instance, 130*b* would be a temperature sensor to the north-west of the focal point. North, in this instance can be true north. North, can be any other polar direction, as directions (e.g., north, south, east, west, north-east) can be used as a simple way to denote adjacency as can be referenced by the controller 120. In some instances, this can be denoted in other ways (e.g., up, down, left, right). Due to the orientation of the detectors and associated fluid distribution devices 110, the controller 120 can determine adjacency and address particular detectors and fluid distribution devices 110 individually based on their respective locations in the grid pattern.

The fluid distribution devices 110 can be spaced along branches of the fluid distribution system 150 at a width 210. The width 210 can range from a distance of 8 ft. to 12 ft. The width 210 can be 10 ft. The branches of the fluid distribution system 150 can be spaced at depth 220. The depth 220 can range from a distance of 8 ft. to 12 ft. The depth 220 can be 10 ft.

The fire 230 shows a particular location where a fire can occur. The fire 230 can be ignited by a number of means (e.g., electrical shortage, battery overheating, chemical reactions, arson). In the position shown, the fire 230 can be covered by a discharge array above and about the fire 230 including at least fluid distribution devices 110*f*, 110*g*, 110*j*, and 110*k*. A discharge array about a fire 230 can be any discharge array that fully encloses the fire 230.

Shown in FIG. 3, among others, is a plan view of a ceiling-only system 100 disposed above a storage structure 105. Shown in particular is a side view of the ceiling-only system 100 disposed above a storage structure 105. The detectors, which can include temperature sensors 130 and smoke detectors 140, can be disposed beneath the ceiling 160 and above the fluid distribution devices 110. The detectors can be disposed a distance of 0 inches to 6 inches beneath the ceiling 160. The fluid distribution devices 110 can be disposed a distance 308 beneath the detectors. The distance 308 can be 0 inches to 36 inches.

As shown in FIG. 3, among others, the temperature sensors 130 and the fluid distribution devices 110 are aligned axially. The fluid distribution devices 110 can be off-set from the temperature sensors 130 a distance ranging from 0 inches to 6 inches. The fluid distribution devices 110 can be off-set from the temperature sensors 130 a distance ranging from 0 inches to 18 inches.

The ceiling 160 of the occupancy can be of any configuration including any one of: a flat ceiling, horizontal ceiling, sloped ceiling or combinations thereof. The ceiling height 306 is preferably defined by the distance between the floor of the storage occupancy and the underside of the ceiling 160 above (or roof deck) within the storage area to be protected, and more preferably defines the maximum height between the floor and the underside of the ceiling 160 above (or roof deck). The plurality of fluid distribution devices 110 can be stored to a storage height 304, in which the storage height 304 preferably defines the maximum height of the storage and a nominal ceiling-to-storage clearance 310 between the ceiling and the top of the highest stored commodity. The ceiling height 306 can be twenty feet or greater, and can be thirty feet or greater, for example, up to a nominal forty-five feet (45 ft.) or higher such as for example up to a nominal fifty feet (50 ft.), fifty-five (55 ft.), sixty feet (60 ft.) or even greater and in particular up to sixty-five feet (65 ft.). Accordingly, the storage height 304 can be twelve feet or greater and can be nominally twenty feet or greater, such as for example, a nominal twenty-five feet (25 ft.) up to a nominal sixty feet or greater, preferably ranging nominally from between twenty feet and sixty feet. For example, the storage height can be up to a maximum nominal storage height 304 of forty-five feet (45 ft.), fifty feet (50 ft.), fifty-five (55 ft.), or sixty feet (60 ft.). Additionally or alternatively, the storage height 304 can be maximized beneath the ceiling 160 to preferably define a minimum nominal ceiling-to-storage clearance 310 of any one of one foot, two feet, three feet, four feet, or five feet or anywhere in between.

Figure 4:
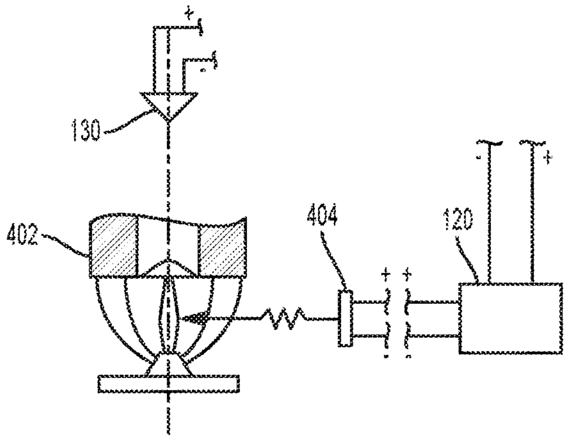
FIG. 4 is a schematic illustration of a fluid distribution device for use in the ceiling-only fire protection of a storage structure.
Figure 5:
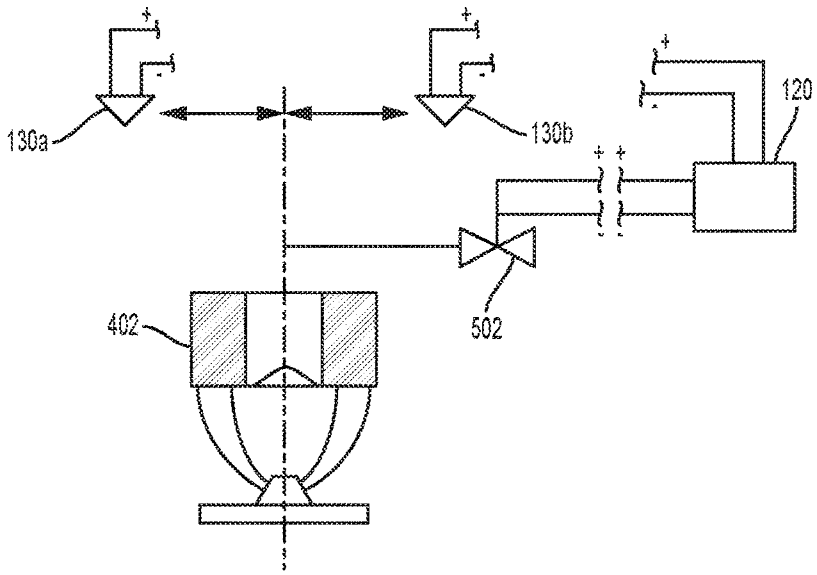
FIG. 5 is a schematic illustration of a fluid distribution device for use in the ceiling-only fire protection of a storage structure.

The fluid distribution device 110 can include a deflecting member coupled to a frame body as schematically shown in FIGS. 4 and 5. The frame body includes an inlet for connection to the piping network and an outlet with an internal passageway extending between the inlet and the outlet. The deflecting member can be axially spaced from the outlet in a fixed spaced relation. Water or other firefighting fluid delivered to the inlet is discharged from the outlet to impact the deflecting member. The deflecting member distributes the firefighting fluid to deliver a volumetric flow which contributes to the preferred collective volumetric flow to address and more preferably extinguish a fire. Alternatively, the deflecting member can translate with respect to the outlet provided it distribute the firefighting fluid in a desired manner upon operation. In the ceiling-only systems described herein, the fluid distribution device 110 can be installed such that its deflecting member is located from the ceiling at a desired deflector-to-ceiling distance 310 as schematically shown in FIG. 3. Alternatively, the device 110 can be installed at any distance from the ceiling 160 provided the installation locates the device above the storage structure 105 being protected in a ceiling-only configuration.

Accordingly, the fluid distribution device 110 can be structurally embodied with a frame body and deflector member of a "fire protection sprinkler" as understood in the art and appropriately configured or modified for controlled actuation as described herein. This configuration can include the frame and deflector of known fire protection sprinklers with modifications described herein. The sprinkler frame and deflectors components for use in the preferred systems and methods can include the components of known sprinklers that have been tested and found by industry accepted organizations to be acceptable for a specified sprinkler performance, such as for example, standard spray, suppression, or extended coverage and equivalents thereof. For example, a fluid distribution device 110 for installation in the system 100 can include a frame body and deflector member having a nominal 25.2 K-factor and configured for electrically controlled operation.

As used herein, the K-factor is defined as a constant representing the sprinkler discharge coefficient, that is quantified by the flow of fluid in gallons per minute (GPM) from the sprinkler outlet divided by the square root of the pressure of the flow of fluid fed into the inlet of the sprinkler passageway in pounds per square inch (PSI). The K-factor is expressed as $GPM/(PSI)^{1/2}$.NFPA 13 provides for a rated or nominal K-factor or rated discharge coefficient of a sprinkler as a mean value over a K-factor range. For example, for a K-factor 14 or greater, NFPA 13 provides the following nominal K-factors (with the K-factor range shown in parenthesis): (i) 14.0 (13.5-14.5) $GPM/(PSI)^{1/2}$; (ii) 16.8 (16.0-17.6) $GPM/(PSI)^{1/2}$; (iii) 19.6 (18.6-20.6) $GPM/(PSI)^{1/2}$; (iv) 22.4 (21.3-23.5) $GPM/(PSI)^{1/2}$; (v) 25.2 (23.9-26.5) $GPM/(PSI)^{1/2}$; and (vi) 28.0 (26.6-29.4) $GPM/(PSI)^{1/2}$; or a nominal K-factor of 33.6 $GPM/(PSI)^{1/2}$ which ranges from about (31.8-34.8 $GPM/(PSI)^{1/2}$). Alternate embodiments of the fluid distribution device 110 can include sprinklers having the aforementioned nominal K-factors or greater.

The fluid distribution device 110 can be an early suppression fast response sprinkler (ESFR) frame body and deflecting member or deflector for use in the systems and methods described herein. The fluid distribution devices 110 can be pendent-type sprinklers; however upright-type sprinklers can be configured or modified for use in the systems described herein. Alternate embodiments of the fluid distribution devices 110 for use in the system 100 can include nozzles, misting devices or any other devices configured for controlled operation to distribute a volumetric flow of firefighting fluid in a manner described herein.

The distribution devices 110 of the system 100 can include a sealing assembly or other internal valve structure disposed and supported within the outlet to control the discharge from the distribution device 110. However, the operation of the fluid distribution device 110 or sprinkler for discharge is not directly or primarily triggered or operated by a thermal or heat-activated response to a fire in the storage occupancy. Instead, the operation of the fluid distribution devices 110 is controlled by the preferred controller 120 of the system in a manner as described herein. More specifically, the fluid distribution devices 110 are coupled directly or indirectly with the controller 120 to control fluid discharge and distribution from the device 110. Shown in FIGS. 4 and 5 are schematic representations of preferred electro-mechanical coupling arrangements between a distribution device assembly 110 and the controller. Shown in FIG. 4 is a fluid distribution device assembly 110 that includes a sprinkler frame body 402 having an internal sealing assembly supported in place by a removable structure, such as for example, a thermally responsive glass bulb trigger or a mechanism that uses a solid link. A transducer and preferably electrically operated actuator 404 is arranged, coupled, or assembled, internally or externally, with the sprinkler for displacing the support structure by fracturing, rupturing, ejecting, or otherwise removing the support structure and its support of the sealing assembly to permit fluid discharge from the sprinkler. The actuator 404 can be electrically coupled to the controller 120 in which the controller provides, directly or indirectly, an electrical pulse or signal for signaled operation of the actuator to displace the support structure and the sealing assembly for controlled discharge of firefighting fluid from the sprinkler.

Distribution device electromechanical arrangements for use in the system 100 can include a sprinkler and electrically responsive explosive actuator arrangement in which a detonator is electrically operated to displace a slidable plunger to rupture a bulb supporting a valve closure in the sprinkler head. The distribution device electromechanical arrangements for use in the system can include a sensitive sprinkler having an outlet orifice with a rupture disc valve upstream of the orifice. An electrically responsive explosive squib is provided with electrically conductive wires that can be coupled to the controller 120. Upon receipt of an appropriate signal, the squib explodes to generate an expanding gas to rupture disc to open the sprinkler. The distribution device electromechanical arrangements for use in the system can include an electrically controlled fluid dispenser for a fire extinguishing system in which the dispenser includes a valve disc supported by a frangible safety device to close the outlet orifice of the dispenser. A striking mechanism having an electrical lead is supported against the frangible safety device. An electrical pulse can be sent through the lead to release the striking mechanism and fracture the safety device thereby removing support for the valve disc to permit extinguishment to flow from the dispenser.

Shown in FIG. 5, is an electromechanical arrangement for controlled actuation that includes an electrically operated solenoid valve 502 in line and upstream from an open sprinkler or other frame body 402 to control the discharge from the device frame. With no seal assembly in the frame outlet, water is permitted to flow from the open sprinkler frame body 402 upon the solenoid valve 502 receiving an appropriately configured electrical signal from the controller 120 to open the solenoid valve depending upon whether the solenoid valve is normally closed or normally open. The valve 502 can be located relative to the frame body 402 such that there is negligible delay, for example about 20 seconds, in delivering fluid to the frame inlet at its working pressure upon opening the valve 502. In one particular solenoid valve arrangement in which there is a one-to-one ratio of valve to frame body, the system can effectively provide for controlled micro-deluge systems to address and more preferably extinguish a fire thereby further limiting and more preferably reducing damage to the occupancy and stored commodity as compared to known deluge arrangements.

Figure 6:
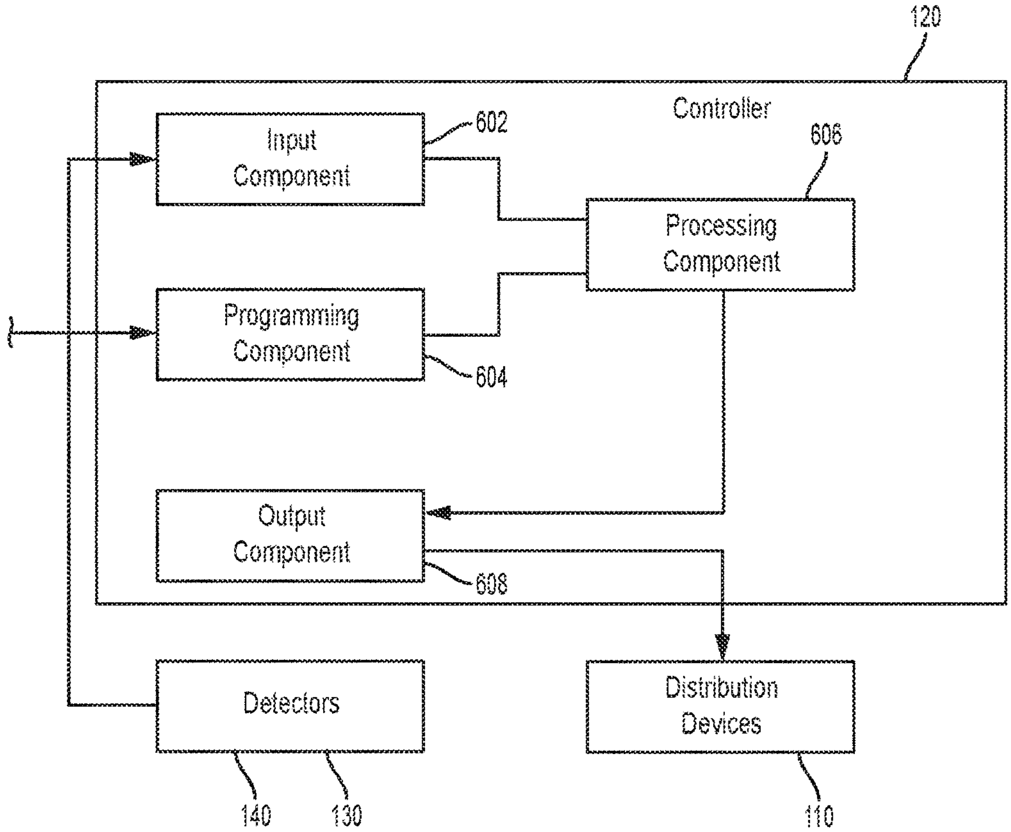
FIG. 6 is a schematic illustration of a controller for use in a ceiling-only fire protection of a storage structure.

As shown in FIG. 6, among others, the controller 120 can be structured for receiving, processing, and generating the various input and output signals from or to each of the detectors and fluid distribution devices 110. Functionally, the preferred controller 120 includes a data input component 602, a programming component 604, a processing component 606 and an output component 608. The data input component 602 receives detection data or signals from the detectors, including temperature sensors 130 or smoke detectors 140. The detection data or signals including, for example, either raw detector data or calibrated data, such as for example, any one of continuous or intermittent temperature data, spectral energy data, smoke data or the raw electrical signals representing such parameters, e.g., voltage, current or digital signal, that would indicate a measured environmental parameter of the occupancy. Additional data parameters collected from the detectors can include time data, address or location data of the detector. The programming component 604 provides for input of user defined parameters, criteria or rules that can define detection of a fire, the location of the fire, the profile of the fire, the magnitude of the fire or a threshold moment in the fire growth. Moreover, the programming component 604 can provide for input of select or user-defined parameters, criteria or rules to identify fluid distribution devices or assemblies 110 for operation in response to the detected fire, including one or more of the following: defining relations between distribution devices 110, e.g., proximity, adjacency, etc., define limits on the number of devices to be operated, i.e., maximum and minimums, the time of operation, the sequence of operation, pattern or geometry of devices for operation, their rate of discharge; or defining associations or relations to detectors. As provided in the control methodologies described herein, detectors including temperature sensors 130 or smoke detectors 140 can be associated with fluid distribution devices 110 on a one-to-one basis or alternatively can be associated with more than one fluid distribution device. Additionally, the input component 602 or programming component 604 can provide for feedback or addressing between the fluid distribution devices 110 and the controller 120 for carrying out the methodologies of the distribution devices in a manner described herein.

Accordingly, the preferred processing controller 606 processes the input and parameters from the input component 602 and programming component 604 to detect and locate a fire, and select, prioritize or identify the fluid distribution devices for controlled operation in a preferred manner. For example, the preferred processing controller 606 generally determines when a threshold moment is achieved; and with the output component 608 of the controller 120 generates appropriate signals to control operation of the identified and preferably addressable distribution devices 110 preferably in accordance with one or more methodologies described herein. The programming may be hard wired or logically programmed and the signals between system components can be one or more of analog, digital, or fiber optic data. Moreover communication between components, for example connections 115, 135, or 145, of the system 100 can be any one or more of wired or wireless communication.

Figure 7:
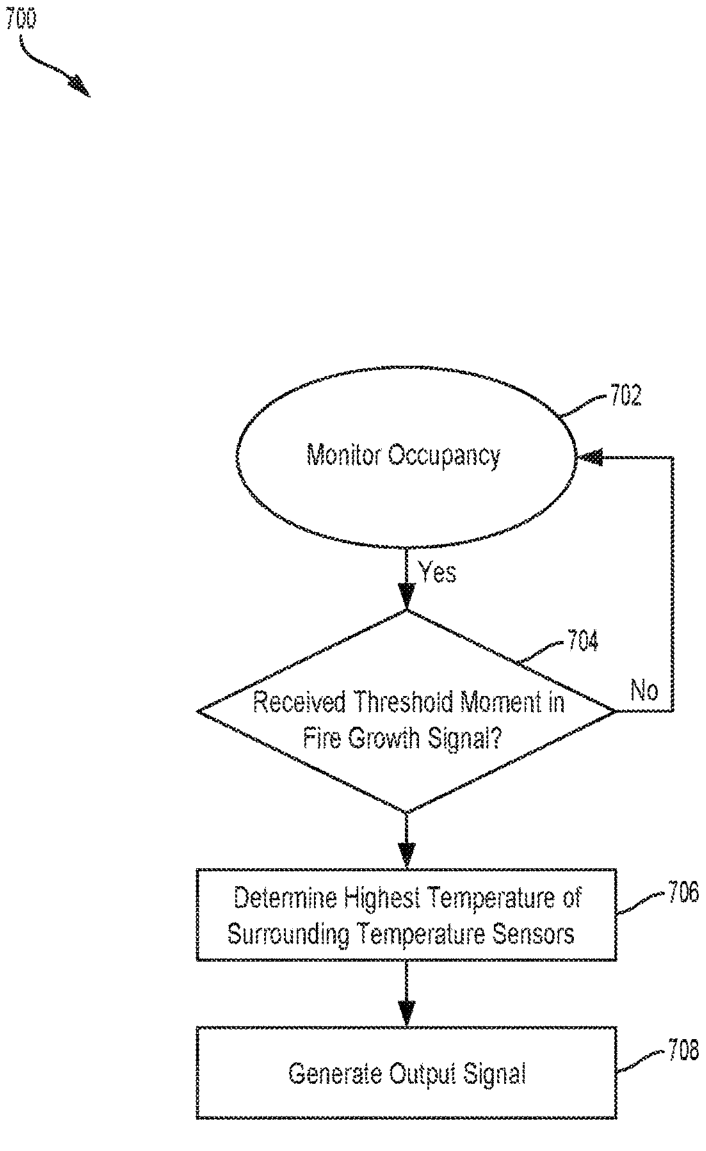
FIG. 7 is a flow diagram depicting a method of extinguishing a fire.

Shown in FIG. 7, among others, is a flowchart of a fire suppression methodology of the controller 120 of the system 100. In a first act 702, the controller 120 continuously monitors the environment of the occupancy based upon sensed or detected input from the detectors. The controller 120 processes the data to determine the presence of a fire 230 in act 704, based on receiving a threshold moment in fire growth signal. The threshold moment in fire growth can be based on sudden change in the sensed data from the detectors, such as for example, a sudden increase in temperature, spectral energy or other measured parameters. The threshold moment in fire growth can be a rate of temperature increase (e.g., 20° F./min) sensed by the temperature sensor 130. The rate of temperature increase can be a predetermined rate of temperature increase as set by an operator. The threshold moment in fire growth can be a particular temperature (e.g., 155° F.) sensed by a temperature sensor 130. The particular temperature can be a predetermined temperature as set by an operator. The threshold moment in fire growth can be a determination of fire from a smoke detector 140.

At act 704, if no signal is received indicating a threshold moment in fire growth, the method can return to act 702 and continue monitoring the occupancy.

Upon receiving a signal indicating a threshold moment in fire growth, the controller 120 can generate a control signal for a fluid distribution device 110 associated with the detector that first sensed the threshold moment in fire growth and all fluid distribution devices 110 immediately surrounding the fluid distribution device 110 associated with the detector that first sensed the threshold moment in fire growth. For example, referring to FIG. 2, if a threshold moment in fire growth is detected by temperature sensor 130*k*, the fluid distribution devices 110*f*, 110*g*, 110*h*, 110*j*, 110*k*, 110*l*, 110*n*, 110*o*, and 110*p* can be activated to suppress the fire 230.

Upon receiving a signal indicating a threshold moment in fire growth, the method can continue to act 706, wherein the controller 120 can determine the highest temperature sensed by the detectors immediately surrounding the detector that first sensed the threshold moment in fire growth. The detector that first sensed the threshold moment in fire growth can be referred to as a first detector. Detectors immediately surrounding the first detector can refer to a simple surrounding, and a full surrounding. The use of a simple surrounding or a full surrounding can be pre-programmed or user-defined. The simple surrounding can refer to detectors to the north, west, east, and south of the first detector, as described above. For example, again referring to FIG. 2, if a threshold moment in fire growth is detected by temperature sensor 130*k*, the temperature sensors simply surrounding the temperature sensor 130*k* can be compared, the temperature sensors simply surrounding 130*k* include 130*g*, 130*j*, 130*l*, and 130*o*. Alternatively, the detectors fully surrounding the detector that first sensed the threshold moment in fire growth can be compared for a highest temperature. The full surrounding can refer to detectors to the north-west, north, north-east, west, east, south-west, south, and south-east, as described above. For example, referring to FIG. 2, if a threshold moment in fire growth is detected by temperature sensor 130*k*, the temperature sensors fully surrounding the temperature sensor 130*k* can be compared, the temperature sensors fully surrounding temperature sensor 130*k* include 130*f*, 130*g*, 130*h*, 130*j*, 130*l*, 130*n*, 130*o*, and 130*p*.

Upon determining a temperature sensor with the highest temperature surrounding the first detector, at act 706, the method can continue to act 708. At act 708, the controller 120 can generate an output/control signal for the fluid distribution device 110 associated with the first detector, the fluid distribution device associated with the detector immediately surrounding the first detector that was determined to have the highest temperature, and all fluid distribution devices 110 immediately surrounding the two fluid distribution devices 110. For example, referring to the example above wherein the temperature sensors fully surrounding the temperature sensor 130*k* were compared. Further in this example, temperature sensor 130*f* can be determined to sense the highest temperature. Based on this, the controller can generate an output/control signal for fluid distribution devices 110*a*, 110*b*, 110*c*, 110*e*, 110*f*, 110*g*, 110*h*, 110*i*, 110*j*, 110*k*, 110*l*, 110*n*, 110*o*, and 110*p* defining a discharge array above and about the fire 230.

Figure 8:
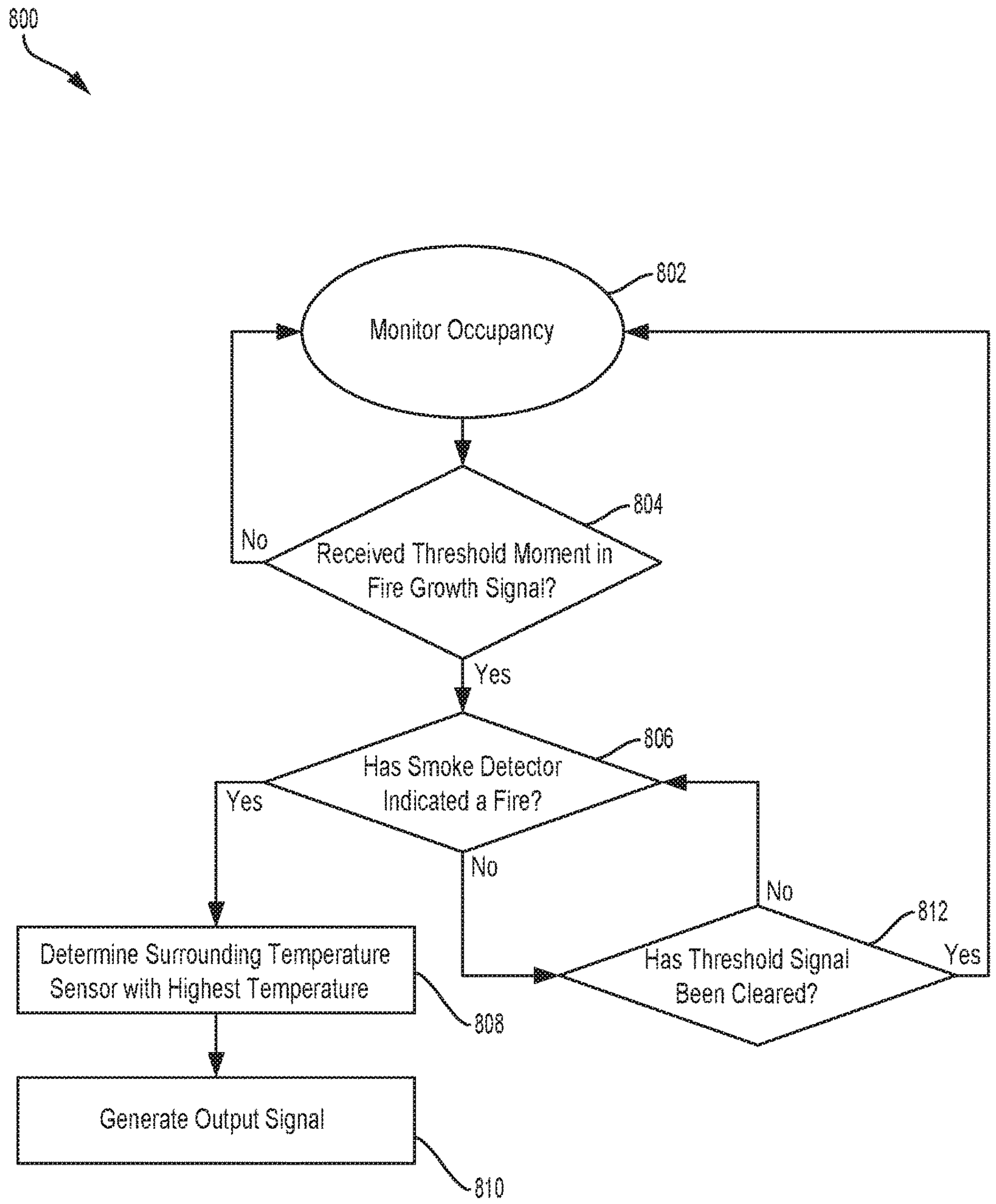
FIG. 8 is a flow diagram depicting a method of extinguishing a fire.

Shown in FIG. 8, among others, is a flowchart of a fire suppression methodology of the controller 120 of the system 100. In a first act 802, the controller 120 continuously monitors the environment of the occupancy based upon sensed or detected input from the detectors. The controller 120 processes the data to determine the presence of a fire 230 in act 804, based on receiving a threshold moment in fire growth signal. The threshold moment in fire growth can be based on sudden change in the sensed data from the detectors, such as for example, a sudden increase in temperature, spectral energy or other measured parameters. The threshold moment in fire growth can be a rate of temperature increase (e.g., 20° F./min), or a particular temperature (e.g., 155° F.) sensed by a temperature sensor 130. Additionally or alternatively, the threshold moment in fire growth can be a determination of fire from a smoke detector 140.

At act 804, if no signal is received indicating a threshold moment in fire growth, the method can return to act 802 and continue monitoring the occupancy.

At act 806, the controller 120 verifies it has received a signal from a smoke detector 140 indicating the presence of smoke. This can be used as a double interlock to ensure the temperature sensors 130 have correctly sensed a fire, and not a simple fluctuation in temperature. In a cross-zone detection orientation, a detection of smoke can be required by two different types of smoke sensors before proceeding to act 812. If it is determined that the smoke detectors 140 have not detected smoke, the method proceeds to act 812 wherein the controller determines if a predetermined period of time (e.g., 5 minutes) has passed since the threshold moment of fire growth signal has been cleared. If it has been equal to or longer than the predetermined period of time, the method returns to act 802 and continues to monitor the occupancy. If the time passed has not been equal to or longer than the predetermined period of time or the threshold moment of fire growth signal is still active, the method can return to act 806 to determine if the controller 120 has received a signal indicating a smoke detector 140 has detected smoke.

When the controller 120 receives a signal indicating a smoke detector 140 has detected smoke at act 806, the method can proceed to act 808. At act 808, the controller 120 can determine the highest temperature sensed by the detectors immediately surrounding the detector that first sensed the threshold moment in fire growth. The detector that first sensed the threshold moment in fire growth can be referred to as a first detector. Detectors immediately surrounding the first detector can refer to a simple surrounding, and a full surrounding. The use of a simple surrounding or a full surrounding can be pre-programmed or user-defined. The simple surrounding can refer to detectors to the north, west, east, and south of the first detector, as described above. For example, again referring to FIG. 2, if a threshold moment in fire growth is detected by temperature sensor 130*k*, the temperature sensors simply surrounding the temperature sensor 130*k* can be compared, the temperature sensors simply surrounding 130*k* include 130*g*, 130*j*, 130*l*, and 130*o*. Alternatively, the detectors fully surrounding the detector that first sensed the threshold moment in fire growth can be compared for a highest temperature. The full surrounding can refer to detectors to the north-west, north, north-east, west, east, south-west, south, and south-east, as described above. For example, referring to FIG. 2, if a threshold moment in fire growth is detected by temperature sensor 130*k*, the temperature sensors fully surrounding the temperature sensor 130*k* can be compared, the temperature sensors fully surrounding temperature sensor 130*k* include 130*f*, 130*g*, 130*h*, 130*j*, 130*l*, 130*n*, 130*o*, and 130*p*.

Upon determining a highest temperature of temperature sensors surrounding the first detector, at act 808, the method can continue to act 810. At act 810, the controller 120 can generate an output/control signal for the fluid distribution device 110 associated with the first detector, the fluid distribution device associated with the detector immediately surrounding the first detector that was determined to have the highest temperature, and all fluid distribution devices 110 immediately surrounding the two fluid distribution devices 110. For example, referring to the example above wherein the temperature sensors simply surrounding the temperature sensor 130*k* were compared. Further in this example, temperature sensor 130*g* can be determined to sense the highest temperature. Based on this, the controller can generate an output/control signal for fluid distribution devices 110*b*, 110*c*, 110*d*, 110*f*, 110*g*, 110*h*, 110*j*, 110*k*, 110*l*, 110*n*, 110*o*, and 110*p* defining a discharge array above and about the fire 230.

Figure 9:
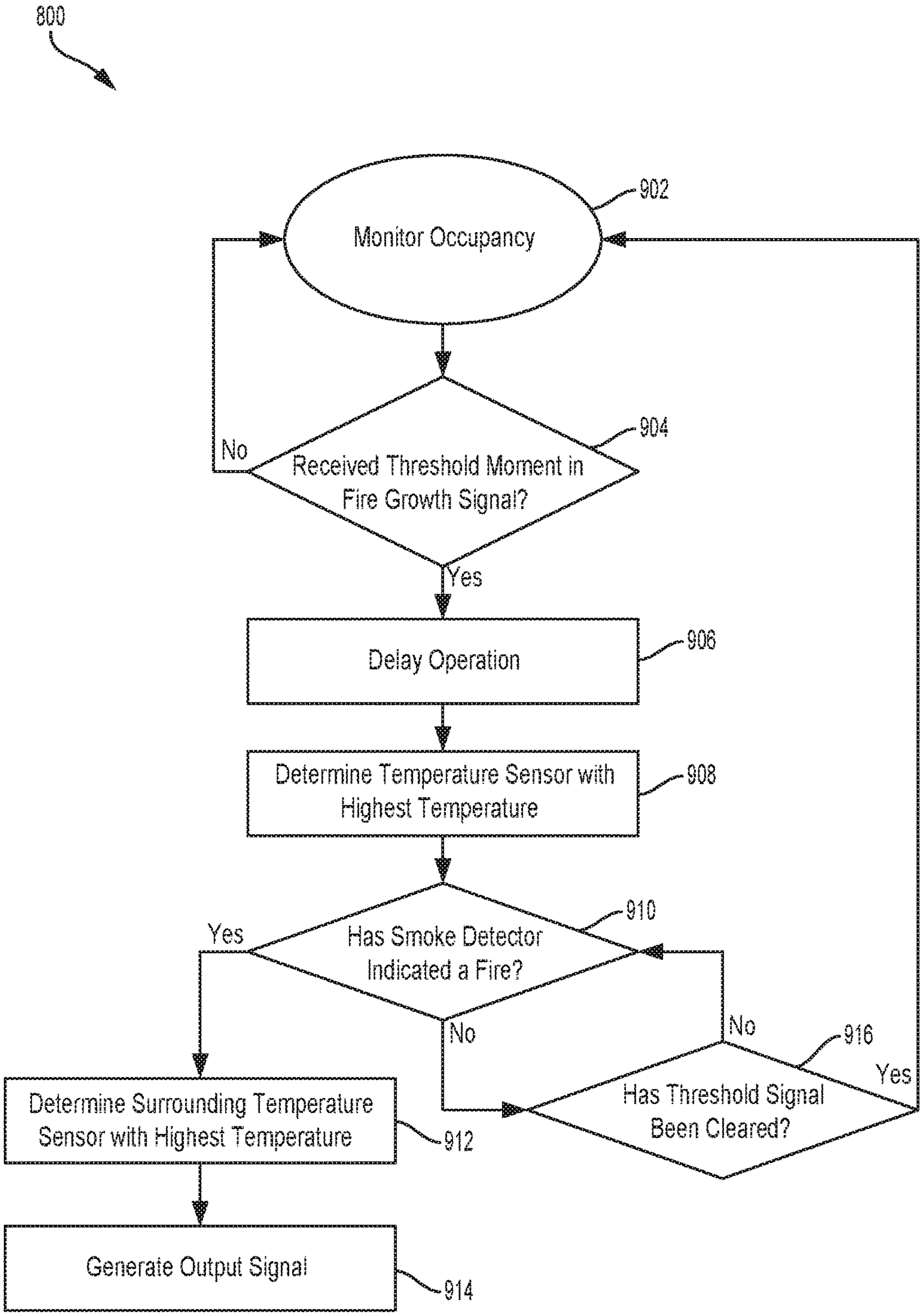
FIG. 9 is a flow diagram depicting a method of extinguishing a fire.

Shown in FIG. 9, among others, is a flowchart of a fire suppression methodology of the controller 120 of the system 100. In a first act 902, the controller 120 continuously monitors the environment of the occupancy based upon sensed or detected input from the detectors. The controller 120 processes the data to determine the presence of a fire 230 in act 904, based on receiving a threshold moment in fire growth signal. The threshold moment in fire growth can be based on sudden change in the sensed data from the detectors, such as for example, a sudden increase in temperature, spectral energy or other measured parameters. The threshold moment in fire growth can be a rate of temperature increase (e.g., 20° F./min), a rate of rise (e.g., with a built in delay period) or a particular temperature (e.g., 155° F.) sensed by a temperature sensor 130. Additionally or alternatively, the threshold moment in fire growth can be a determination of fire from a smoke detector 140.

At act 904, if no signal is received indicating a threshold moment in fire growth, the method can return to act 902 and continue monitoring the occupancy.

At act 906, the controller 120 can delay operation for a predetermined period of time (e.g., 5 seconds, 10 seconds, 20 seconds 30 seconds, 1 minute). The delay can allow for the location of a potential fire 230 within the storage structure 105 to be more accurately determined. This can be due to a possible accumulation of heat directly above the fire 230.

At act 908, the controller 120 can determine the highest temperature sensed by the plurality of temperature sensor. At act 908, the controller 120 can determine the highest temperature sensed by a subset of detectors including the detector that first sensed the threshold moment in fire growth, and the sensors immediately surrounding the detector that first sensed the threshold moment in fire growth. The detector that first sensed the threshold moment in fire growth can be referred to as a first detector. Detectors immediately surrounding the first detector can refer to a simple surrounding, and a full surrounding. The use of a simple surrounding or a full surrounding can be pre-programmed or user-defined. The simple surrounding can refer to detectors to the north, west, east, and south of the first detector, as described above. For example, again referring to FIG. 2, if a threshold moment in fire growth is detected by temperature sensor 130*k*, the temperature sensors simply surrounding the temperature sensor 130*k* can be compared, the temperature sensors simply surrounding 130*k* include 130*g*, 130*j*, 130*l*, and 130*o*. Alternatively, the detectors fully surrounding the detector that first sensed the threshold moment in fire growth can be compared for a highest temperature. The full surrounding can refer to detectors to the north-west, north, north-east, west, east, south-west, south, and south-east, as described above. For example, referring to FIG. 2, if a threshold moment in fire growth is detected by temperature sensor 130*k*, the temperature sensors fully surrounding the temperature sensor 130*k* can be compared, the temperature sensors fully surrounding temperature sensor 130*k* include 130*f*, 130*g*, 130*h*, 130*j*, 130*l*, 130*n*, 130*o*, and 130*p*. The detector that is determined to have the highest temperature of the subset of detectors including the first detector and the detectors immediately surrounding the first detector is determined to be the focal point detector.

At act 910, the controller 120 verifies it has received a signal from a smoke detector 140 indicating the presence of smoke. This can be used as a double interlock to ensure the temperature sensors 130 have correctly sensed a fire, and not a simple fluctuation in temperature. In a cross-zone detection orientation, a detection of smoke can be required by two different types of smoke sensors before proceeding to act 916. If it is determined that the smoke detectors 140 have not detected smoke, the method proceeds to act 916 wherein the controller determines if a predetermined period of time (e.g., 5 minutes) has passed since the threshold moment of fire growth signal has been cleared. If it has been equal to or longer than the predetermined period of time, the method returns to act 902 and continues to monitor the occupancy. If the time passed has not been equal to or longer than the predetermined period of time or the threshold moment of fire growth signal is still active, the method can return to act 910 to determine if the controller 120 has received a signal indicating a smoke detector 140 has detected smoke.

When the controller 120 receives a signal indicating a smoke detector 140 has detected smoke at act 910, the method can proceed to act 912. At act 912, the controller 120 can determine the highest temperature sensed by the detectors immediately surrounding the focal point detector. The method can proceed to act 912 without the indication from a smoke detector at act 910.

Upon determining a highest temperature of temperature sensors surrounding the focal point detector, at act 912, the method can continue to act 914. At act 914, the controller 120 can generate an output/control signal for the fluid distribution device 110 associated with the focal point detector, the fluid distribution device associated with the detector immediately surrounding the focal point detector that was determined to have the highest temperature, and all fluid distribution devices 110 immediately surrounding the two fluid distribution devices 110. For example, referring to the example above wherein the temperature sensors simply surrounding the temperature sensor 130*k* were compared. Further in this example, temperature sensor 130*g* can be determined to sense the highest temperature. Based on this, the controller can generate an output/control signal for fluid distribution devices 110*b*, 110*c*, 110*d*, 110*f*, 110*g*, 110*h*, 110*j*, 110*k*, 110*l*, 110*n*, 110*o*, and 110*p* defining a discharge array above and about the fire 230.

Figure 10:
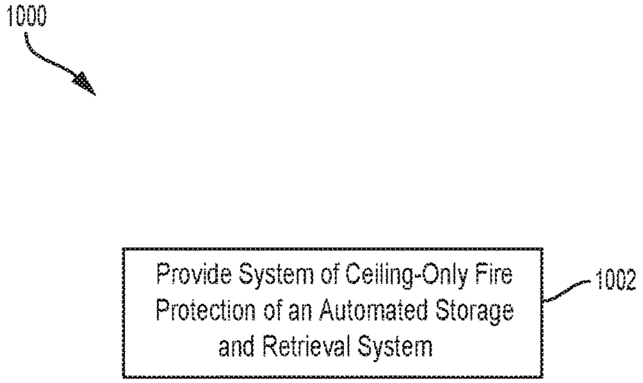
FIG. 10 is a flow diagram depicting a method of providing a ceiling-only fire protection of a storage structure.

FIG. 10, among others, refers to a method of providing a system of ceiling-only fire protection of a storage structure 105. At act 1002, the method includes providing a system of ceiling-only fire protection of a storage structure. The system can include, as described above, a plurality of fluid distribution devices 110, a fluid distribution system 150, a plurality of detectors to monitor the storage structure 105 for a fire 230, and a controller 120. The plurality of controllers can be disposed in a grid pattern beneath a ceiling and above a storage structure 105. The storage structure 105 can have a nominal storage height less than a nominal ceiling height. Each of the fluid distribution devices 110 can include a frame body 402 with a seal assembly disposed therein. Each of the fluid distribution devices 110 can further include an actuator 404 arranged with the frame body 402 to displace the seal assembly to control a flow of water discharge from the frame body 402. The fluid distribution system 150 can include a network of pipes interconnecting the plurality of fluid distribution devices 110 with a water supply. The controller 120 can be coupled with the plurality of detectors to detect and locate the fire 230. The controller 120 can be further coupled to the plurality of fluid distribution devices 110 that define a discharge array above and about the fire. The controller can receive an input signal from each of the plurality of detectors.

As described herein, the use of a simple surrounding or a full surrounding can be pre-programmed or user defined. Moreover, the choice of a simple surrounding or a full surrounding can be based upon one or more factors of the system 100 or the commodity being protected, such as for example, the type of distribution device 110 of the system 100, their installation configuration including spacing and hydraulic requirements, the type or sensitivity of the detectors, the type or category of hazard of the commodity being protected, storage arrangement, storage height or the maximum height of the ceiling of the storage occupancy. For example, for more hazardous commodities such as Group A exposed expanded plastics stored beneath a rectilinear grid of distribution devices, full surrounding can be preferable to a simple surrounding as it can provide up to 14 fluid distribution devices 110 compared to the 12 fluid distribution devices 110 possible with the simple surrounding. The resulting discharge array preferably delivers and distributes the fixed volumetric flow of firefighting fluid preferably substantially above and about the site of a detected fire 230 in order to effectively address and more preferably extinguish the fire.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein can be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining can be stationary (e.g., permanent or fixed) or moveable (e.g., removable or releasable). Such joining can be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

What is claimed is:

1. A system of ceiling-only fire protection of a storage structure, comprising:

a plurality of fluid distribution devices disposed in a grid pattern beneath a ceiling and above the storage structure having a nominal storage height less than a nominal ceiling height, wherein each of the plurality of fluid distribution devices includes a frame body with a seal assembly disposed therein and an actuator arranged with the frame body to displace the seal assembly to control a flow of water discharge from the frame body;

a fluid distribution system including a network of pipes interconnecting the plurality of fluid distribution devices with a water supply;

a plurality of detectors to monitor the storage structure for a fire; and a controller coupled with the plurality of detectors to detect and locate the fire, the controller being coupled to the plurality of fluid distribution devices to identify and control operation of a select number of the plurality of fluid distribution devices that define a discharge array above and about the fire, the controller:

receives an input signal indicating the fire from at least some of the plurality of detectors;

identifies, using the input signal, a first detector of the at least some of the plurality of detectors sensing a highest temperature; and determines adjacency of each of the at least some of the plurality of detectors relative to the first detector based on respective locations of each of the at least some of the plurality of detectors in the grid pattern.

2. The system of claim 1, comprising:
the controller to:
determine a threshold moment in fire growth from one of a plurality of temperature sensors, wherein the threshold moment in fire growth is a temperature above a predetermined temperature; and
generate an output signal for operation of a fluid distribution device associated with the one of a plurality of temperature sensors and all fluid distribution devices immediately surrounding the fluid distribution device associated with the one of a plurality of temperature sensors.

3. The system of claim 1, comprising:
the controller to:
determine a threshold moment in fire growth from one of a plurality of temperature sensors, wherein the threshold moment in fire growth is a rate of rise condition above a predetermined rate of rise; and
generate an output signal for operation of a fluid distribution device associated with the one of a plurality of temperature sensors and all fluid distribution devices immediately surrounding the fluid distribution device associated with the one of a plurality of temperature sensors.

4. The system of claim 1, comprising:
the controller to:
determine a threshold moment in fire growth from one of a plurality of temperature sensors, wherein the threshold moment in fire growth is a temperature above a predetermined temperature;
determine a temperature sensor with the highest temperature located to the north, south, east, and west of the one of a plurality of temperature sensors; and
generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, and west of the one of a plurality of temperature sensors.

5. The system of claim 1, comprising:
the controller to:
determine a threshold moment in fire growth from one of a plurality of temperature sensors, wherein the threshold moment in fire growth is a rate of rise condition above a predetermined rate of rise;
determine a temperature sensor with the highest temperature located to the north, south, east, and west of the one of a plurality of temperature sensors; and
generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, and west of the one of a plurality of temperature sensors.

6. The system of claim 1, comprising:
the controller to:
determine a threshold moment in fire growth from one of a plurality of temperature sensors, wherein the threshold moment in fire growth is a temperature above a predetermined temperature;
determine a temperature sensor with the highest temperature located to the north, south, east, west, north-west, north-east, south-west, and south-east of the one of a plurality of temperature sensors; and
generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, west, north-west, north-east, south-west, and south-east of the one of a plurality of temperature sensors.

7. The system of claim 1, comprising:
the controller to:
determine a threshold moment in fire growth from one of a plurality of temperature sensors, wherein the threshold moment in fire growth is a rate of rise condition above a predetermined rate of rise;
determine a temperature sensor with the highest temperature located to the north, south, east, west, north-west, north-east, south-west, and south-east of the one of a plurality of temperature sensors; and
generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, west, north-west, north-east, south-west, and south-east of the one of a plurality of temperature sensors.

8. The system of claim 1, comprising:
the controller to:
determine a threshold moment in fire growth from one of a plurality of temperature sensors, wherein the threshold moment in fire growth is a rate of rise condition above a predetermined rate of rise;
determine at least one of a plurality of smoke detectors have detected smoke; and
generate an output signal for operation of a fluid distribution device associated with the one of a plurality of temperature sensors and all fluid distribution devices immediately surrounding the fluid distribution device associated with the one of a plurality of temperature sensors.

9. The system of claim 1, comprising:
the controller to:
determine a threshold moment in fire growth from one of a plurality of temperature sensors, wherein the threshold moment in fire growth is a temperature above a predetermined temperature;
determine at least one of a plurality of smoke detectors have detected smoke; and
generate an output signal for operation of a fluid distribution device associated with the one of a plurality of temperature sensors and all fluid distribution devices immediately surrounding the fluid distribution device associated with the one of a plurality of temperature sensors.

10. The system of claim 1, comprising:
the controller to:

determine a threshold moment in fire growth from one of a plurality of temperature sensors, wherein the threshold moment in fire growth is a rate of rise condition above a predetermined rate of rise;

determine at least one of a plurality of smoke detectors have detected smoke;

determine a temperature sensor with the highest temperature located to the north, south, east, and west of the one of a plurality of temperature sensors; and generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, and west of the one of a plurality of temperature sensors.

11. The system of claim 1, comprising:

the controller to:

determine a threshold moment in fire growth from one of a plurality of temperature sensors, wherein the threshold moment in fire growth is a temperature above a predetermined temperature;

determine at least one of a plurality of smoke detectors have detected smoke;

determine a temperature sensor with the highest temperature located to the north, south, east, and west of the one of a plurality of temperature sensors; and generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, and west of the one of a plurality of temperature sensors.

12. The system of claim 1, comprising:

the controller to:

determine a threshold moment in fire growth from one of a plurality of temperature sensors, wherein the threshold moment in fire growth is a rate of rise condition above a predetermined rate of rise;

determine at least one of a plurality of smoke detectors have detected smoke;

determine a temperature sensor with the highest temperature located to the north, south, east, west, north-west, north-east, south-west, and south-east of the one of a plurality of temperature sensors; and generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, west, north-west, north-east, south-west, and south-east of the one of a plurality of temperature sensors.

13. The system of claim 1, comprising:

the controller to:

determine a threshold moment in fire growth from one of a plurality of temperature sensors, wherein the threshold moment in fire growth is a temperature above a predetermined temperature;

determine at least one of a plurality of smoke detectors have detected smoke;

determine a temperature sensor with the highest temperature located to the north, south, east, west, north-west, north-east, south-west, and south-east of the one of a plurality of temperature sensors; and generate an output signal for operation of a fluid distribution device associated with the one of a plurality of temperature sensors and all fluid distribution devices immediately surrounding the fluid distribution device associated with the one of a plurality of temperature sensors and the fluid distribution device associated with the temperature sensor with the highest temperature located to the north, south, east, west, north-west, north-east, south-west, and south-east of the one of a plurality of temperature sensors.

14. The system of claim 1, comprising:

the controller to:

determine a threshold moment in fire growth from one of a plurality of temperature sensors, wherein the threshold moment in fire growth is a rate of rise condition above a predetermined rate of rise;

delay operation for a predetermined period of time;

determine a temperature sensor with the highest temperature of a subset of the plurality of temperature sensors including the one of a plurality of temperature sensors and temperature sensors located to the north, south, east, and west of the one of a plurality of temperature sensors, wherein the temperature sensor with the highest temperature is set as a focal point sensor;

determine at least one of a plurality of smoke detectors have detected smoke;

determine a temperature sensor with the highest temperature located to the north, south, east, and west of the focal point sensor; and generate an output signal for operation of a fluid distribution device associated with the focal point sensor and all fluid distribution devices immediately surrounding the fluid distribution device associated with the focal point sensor and the fluid distribution device associated with the temperature sensor with the highest temperature located to the north, south, east, and west of the focal point sensor.

15. The system of claim 1, comprising:

the controller to:

determine a threshold moment in fire growth from one of a plurality of temperature sensors, wherein the threshold moment in fire growth is a rate of rise condition above a predetermined rate of rise;

delay operation for a predetermined period of time;

determine a temperature sensor with the highest temperature of a subset of the plurality of temperature sensors including the one of a plurality of temperature sensors and temperature sensors located to the north, south, east, and west of the one of a plurality of temperature sensors, wherein the temperature sensor with the highest temperature is set as a focal point sensor;

determine a temperature sensor with the highest temperature located to the north, south, east, and west of the focal point sensor; and generate an output signal for operation of a fluid distribution device associated with the focal point sensor and all fluid distribution devices immediately surrounding the fluid distribution device associated with the focal point sensor and the fluid distribution device associated with the temperature sensor with the highest temperature located to the north, south, east, and west of the focal point sensor.

16. The system of claim 1, comprising:

the controller to:

determine a threshold moment in fire growth from one of a plurality of temperature sensors, wherein the threshold moment in fire growth is a rate of rise condition above a predetermined rate of rise;

delay operation for a predetermined period of time;

determine a temperature sensor with the highest temperature of a subset of the plurality of temperature sensors including the one of a plurality of temperature sensors and temperature sensors located to the north, south, east, west, north-west, north-east, south-west, and south-east of the one of a plurality of temperature sensors, wherein the temperature sensor with the highest temperature is set as a focal point sensor;

determine at least one of a plurality of smoke detectors have detected smoke;

determine a temperature sensor with the highest temperature located to the north, south, east, west, north-west, north-east, south-west, and south-east of the focal point sensor; and generate an output signal for operation of a fluid distribution device associated with the focal point sensor and all fluid distribution devices immediately surrounding the fluid distribution device associated with the focal point sensor and the fluid distribution device associated with the temperature sensor with the highest temperature located to the north, south, east, west, north-west, north-east, south-west, and south-east of the focal point sensor.

17. The system of claim 1, comprising:

the controller to:

determine a threshold moment in fire growth from one of a plurality of temperature sensors, wherein the threshold moment in fire growth is a rate of rise condition above a predetermined rate of rise;

delay operation for a predetermined period of time;

determine a temperature sensor with the highest temperature of a subset of the plurality of temperature sensors including the one of a plurality of temperature sensors and temperature sensors located to the north, south, east, west, north-west, north-east, south-west, and south-east of the one of a plurality of temperature sensors, wherein the temperature sensor with the highest temperature is set as a focal point sensor;

determine a temperature sensor with the highest temperature located to the north, south, east, west, north-west, north-east, south-west, and south-east of the focal point sensor; and generate an output signal for operation of a fluid distribution device associated with the focal point sensor and all fluid distribution devices immediately surrounding the fluid distribution device associated with the focal point sensor and the fluid distribution device associated with the temperature sensor with the highest temperature located to the north, south, east, west, north-west, north-east, south-west, and south-east of the focal point sensor.

18. The system of claim 1, comprising:

the controller to:

determine a threshold moment in fire growth from one of a plurality of temperature sensors, wherein the threshold moment in fire growth is a rate of rise condition above a predetermined rate of rise;

delay operation for a predetermined period of time;

determine a temperature sensor with the highest temperature of a subset of the plurality of temperature sensors including the one of a plurality of temperature sensors and temperature sensors located to the north, south, east, west, north-west, north-east, south-west, and south-east of the one of a plurality of temperature sensors, wherein the temperature sensor with the highest temperature is set as a focal point sensor;

determine at least one of a plurality of smoke detectors have detected smoke; and generate an output signal for operation of a fluid distribution device associated with the focal point sensor and all fluid distribution devices immediately surrounding the fluid distribution device associated focal point sensor.

19. The system of claim 1, comprising:

the controller to:

determine a threshold moment in fire growth from one of a plurality of temperature sensors, wherein the threshold moment in fire growth is a rate of rise condition above a predetermined rate of rise;

delay operation for a predetermined period of time;

determine a temperature sensor with the highest temperature of a subset of the plurality of temperature sensors including the one of a plurality of temperature sensors and temperature sensors located to the north, south, east, west, north-west, north-east, south-west, and south-east of the one of a plurality of temperature sensors, wherein the temperature sensor with the highest temperature is set as a focal point sensor; and generate an output signal for operation of a fluid distribution device associated with the focal point sensor and all fluid distribution devices immediately surrounding the fluid distribution device associated focal point sensor.

20. The system of claim 1, wherein the frame body defines a nominal K-factor of any one of 14.0 GPM/PSI$^{1/2}$, 16.8 GPM/PSI$^{1/2}$, 16.8 GPM/PSI$^{1/2}$, 19.6 GPM/PSI$^{1/2}$, 22.4 GPM/PSI$^{1/2}$, 25.2 GPM/PSI$^{1/2}$, 25.5 GPM/PSI$^{1/2}$, 28.0 GPM/PSI$^{1/2}$, and 33.6 GPM/PSI$^{1/2}$.

* * * * *